(12) United States Patent
Chang (10) Patent No.: US 8,635,073 B2
(45) Date of Patent: Jan. 21, 2014

(54) WIRELESS MULTIMODAL VOICE BROWSER FOR WIRELINE-BASED IPTV SERVICES

(75) Inventor: Harry Chang, Auston, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1070 days.

(21) Appl. No.: 11/226,646

(22) Filed: Sep. 14, 2005

(65) Prior Publication Data

US 2007/0061149 A1 Mar. 15, 2007

(51) Int. Cl.
G10L 21/00 (2013.01)

(52) U.S. Cl.
USPC .......... 704/275; 725/88; 725/58; 725/48; 725/29; 725/133; 725/131; 715/866; 709/218; 709/217; 709/203; 709/202; 707/2; 704/270.1; 704/270; 455/575.1; 455/556.1; 455/445; 455/12.1; 386/83; 386/259; 370/352; 345/1.3; 211/26.1; 348/725

(58) Field of Classification Search
USPC .......... 704/270, 270.1, 275; 386/83, 259; 345/1.3; 709/218, 217, 203, 202; 370/352; 455/445, 575.1, 556.1, 12.1; 348/725; 725/88, 58, 48, 29, 133, 131; 715/866; 707/2; 211/26.1
See application file for complete search history.

(56) References Cited

U.S. PATENT DOCUMENTS

| | | | |
|---|---|---|---|
| 4,931,950 A | 6/1990 | Isle et al. | |
| 5,305,244 A | 4/1994 | Newman et al. | |
| 5,377,303 A | 12/1994 | Firman | |
| 5,519,809 A * | 5/1996 | Husseiny et al. | 704/275 |
| 5,566,294 A * | 10/1996 | Kojima et al. | 715/866 |
| 5,818,423 A | 10/1998 | Pugliese et al. | |
| 5,893,063 A | 4/1999 | Loats et al. | |
| 5,930,784 A * | 7/1999 | Hendrickson | 1/1 |
| 5,988,404 A * | 11/1999 | Wilen | 211/26.1 |
| 5,995,936 A * | 11/1999 | Brais et al. | 704/275 |
| 6,012,030 A | 1/2000 | French-St. George et al. | |
| 6,157,705 A | 12/2000 | Perrone | |
| 6,456,978 B1 * | 9/2002 | Wymore et al. | 704/275 |
| 6,499,015 B2 | 12/2002 | Brooks et al. | |
| 6,523,061 B1 * | 2/2003 | Halverson et al. | 709/202 |
| 6,532,446 B1 * | 3/2003 | King | 704/270.1 |
| 6,654,721 B2 * | 11/2003 | Handelman | 704/270 |
| 6,879,584 B2 * | 4/2005 | Thro et al. | 370/352 |
| 6,920,425 B1 | 7/2005 | Will et al. | |
| 7,376,441 B2 * | 5/2008 | Lee | 455/556.1 |
| 2001/0054087 A1 * | 12/2001 | Flom et al. | 709/218 |
| 2002/0028063 A1 * | 3/2002 | Haneda et al. | 386/83 |
| 2002/0095473 A1 * | 7/2002 | Berkowitz et al. | 709/217 |
| 2003/0018980 A1 * | 1/2003 | Gorbatov et al. | 725/133 |

(Continued)

*Primary Examiner* — Michael Colucci
(74) *Attorney, Agent, or Firm* — Jackson Walker L.L.P.

(57) ABSTRACT

In accordance with one aspect of the present invention, a method selects a program from a library of programs. A user selection is determined based upon a voice command, and the program is presented at a display device in accordance with the voice command. In accordance with another aspect of the present invention, a system selects a program from a library of programs. The system includes a processor that determines a user selection based upon a voice command, and also includes a display device that presents the program in accordance with the voice command. In accordance with yet another embodiment of the present invention, a computer-readable medium contains a set of instructions that when executed by a processor cause the processor to determine a user selection based upon a voice command and to command a display device to present the program, in accordance with the voice command.

23 Claims, 3 Drawing Sheets

(56) References Cited

U.S. PATENT DOCUMENTS

| | | |
|---|---|---|
| 2003/0020671 A1* | 1/2003 | Santoro et al. ............... 345/1.3 |
| 2003/0074200 A1* | 4/2003 | Kuzunuki et al. .......... 704/270.1 |
| 2003/0192045 A1* | 10/2003 | Fellenstein et al. ............. 725/29 |
| 2004/0192198 A1* | 9/2004 | Montebruno et al. ....... 455/12.1 |
| 2004/0197082 A1* | 10/2004 | Yim ................................ 386/83 |
| 2004/0204194 A1* | 10/2004 | Akai et al. ................. 455/575.1 |
| 2004/0235482 A1* | 11/2004 | Sylvain ......................... 455/445 |
| 2004/0267880 A1* | 12/2004 | Patiejunas .................... 709/203 |
| 2005/0028208 A1* | 2/2005 | Ellis et al. ....................... 725/58 |
| 2005/0122435 A1* | 6/2005 | Yunoki ......................... 348/725 |
| 2006/0041923 A1* | 2/2006 | McQuaide, Jr. .............. 725/131 |
| 2006/0041926 A1* | 2/2006 | Istvan et al. .................. 725/133 |
| 2006/0294555 A1* | 12/2006 | Xie ................................. 725/88 |
| 2007/0061842 A1* | 3/2007 | Walter et al. ................... 725/48 |

* cited by examiner

WIRELESS MULTIMODAL VOICE BROWSER FOR WIRELINE-BASED IPTV SERVICES

BACKGROUND OF THE INVENTION

1. Field of the Invention

The present invention relates to the field of intelligent displaying of content, and more particularly to selection of audio-visual content for displaying.

2. Description of the Related Art

Home entertainment systems generally allow users to display audio-visual content, including movies, sporting events, and educational programs. However, selection of the content may be cumbersome. Hundreds of channels may be available through a satellite or cable system, and hundreds or thousands of other programs and other audio-visual content may be available through a Video On Demand (VOD) or a Pay Per View (PPV) server. Many systems provide only a simple scroll-bar for the user to interface, and consequently force the user to scroll through a lengthy list of available programming to select a program to view. Moreover, each program is usually identified by a few words of text. If the user does not recognize a particular program by the few words that the user interface is able to provide, the user might scroll past the program and not view it. Consequently, programs that the user might want to watch can be ignored by the user simply because the user cannot recognize the name of the program from the user interface that the system provides.

SUMMARY OF THE INVENTION

In accordance with one aspect of the present invention, a method selects a program from a library of programs. A user selection is determined based upon a voice command, and the program is presented at a display device in accordance with the voice command. In accordance with another aspect of the present invention, a system selects a program from a library of programs. The system includes a processor that determines a user selection based upon a voice command, and also includes a display device that presents the program in accordance with the voice command. In accordance with yet another embodiment of the present invention, a computer-readable medium contains a set of instructions that when executed by a processor cause the processor to determine a user selection based upon a voice command and to command a display device to present the program, in accordance with the voice command.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of an exemplary embodiment, taken in conjunction with the accompanying drawings, in which like elements have been given like numerals.

DETAILED DESCRIPTION OF THE INVENTION

In view of the above, the present invention through one or more of its various aspects and/or embodiments is presented to provide one or more advantages, such as those noted below.

Figure 1:
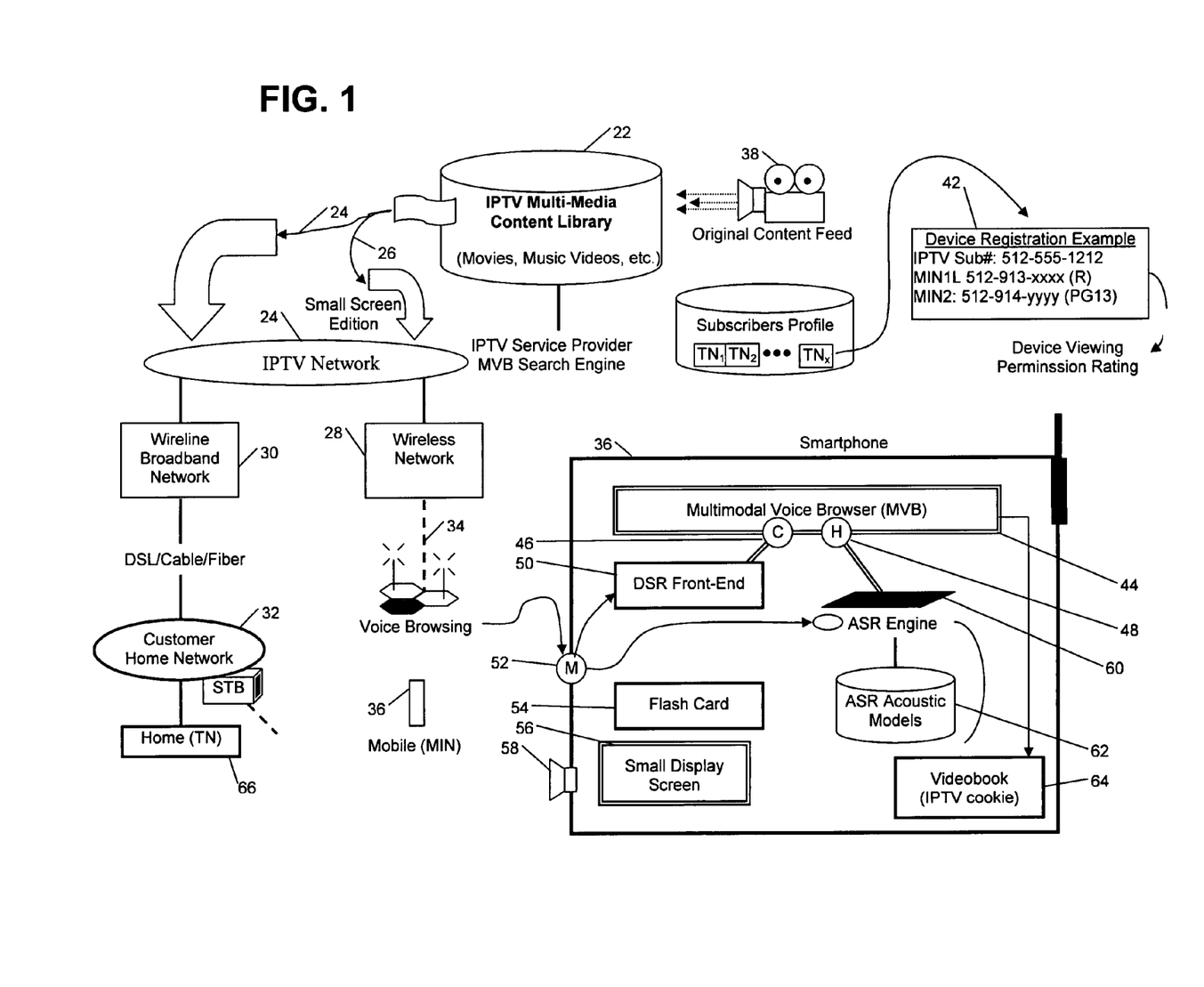
FIG. 1 is a schematic diagram of a system for selecting a program from a library of programs, in accordance with one embodiment of the present invention.

FIG. 1 is a schematic diagram of a system 10 for selecting a program from a library of programs, in accordance with one embodiment of the present invention.

An IPTV (Internet Protocol Television) Multi-Media Content Library 22 may receive an assortment of content, including movies, music videos, still images, slide shows, and audio-only content from an Original Content Feed 38, and may store all or some of such content. The IPTV Multi-Media Content Library 22 may contain multiple versions of some content, including a small-screen version and a large-screen version, and may be connected to deliver a movie, for example, to an IPTV network 24. The IPTV network 24 may be configured to deliver the small-screen version of the movie to a wireless network 28, and a large-screen version of the movie to a wireline broadband network 30. The wireless network 28 may allow the IPTV network 24 to communicate wirelessly with a smart phone 36 or other wireless device having a mobile identification number (MIN). Similarly, a subscriber profile may store a device registration 42. It should be noted that the terms movie, video content, channel, program and TV programs are used herein interchangeably. The terms command and information are also used interchangeably.

The smart phone 36 may have a microphone (M) 52 able to detect speech that is spoken near the smart phone 36. The microphone (M) 52 may provide a signal to a DSR Front-end 50 and to an ASR Engine 60. The DSR Front-end 50 may record the signal in a high fidelity mode (such as at 256 Kbits in mono recording) and may compress the digitized audio in real time without losing any vital information needed by the ASR system—a part of the MVB Search Engine installed on the network side (a "network" ASR). The DSR Front-end 50 may provide a first signal to a Multimodal Voice Browser (MVB) 44 via a C 46, and the ASR Engine 60 provides a second signal to the Multimodal Voice Browser (MVB) 44 via an H 48. The ASR Engine 60 may use ASR Acoustic Models 62. A Flash Card 54 may be used to store a program that can be executed. The smart phone 36 may also have a Small Display screen 56 and a loudspeaker 58 that can present, for example, the small-screen version of the movie. The smart phone 36 may also have a videobook (IPRV cookie) 64.

In response to a command received from the smart phone 36, IPTV network 24 may provide the large-screen version of the movie to a customer home network 32 via a wireline broadband network 30. The wireline broadband network 30 may be implemented as a Digital Subscriber Loop (DSL) line, a cable connection, a fiber-optic connection, a satellite connection, or other connection operative to provide content. The customer home network 32 may include a set top box (STB), and may be connected to a home 66 having a telephone number (TN).

Figure 2:
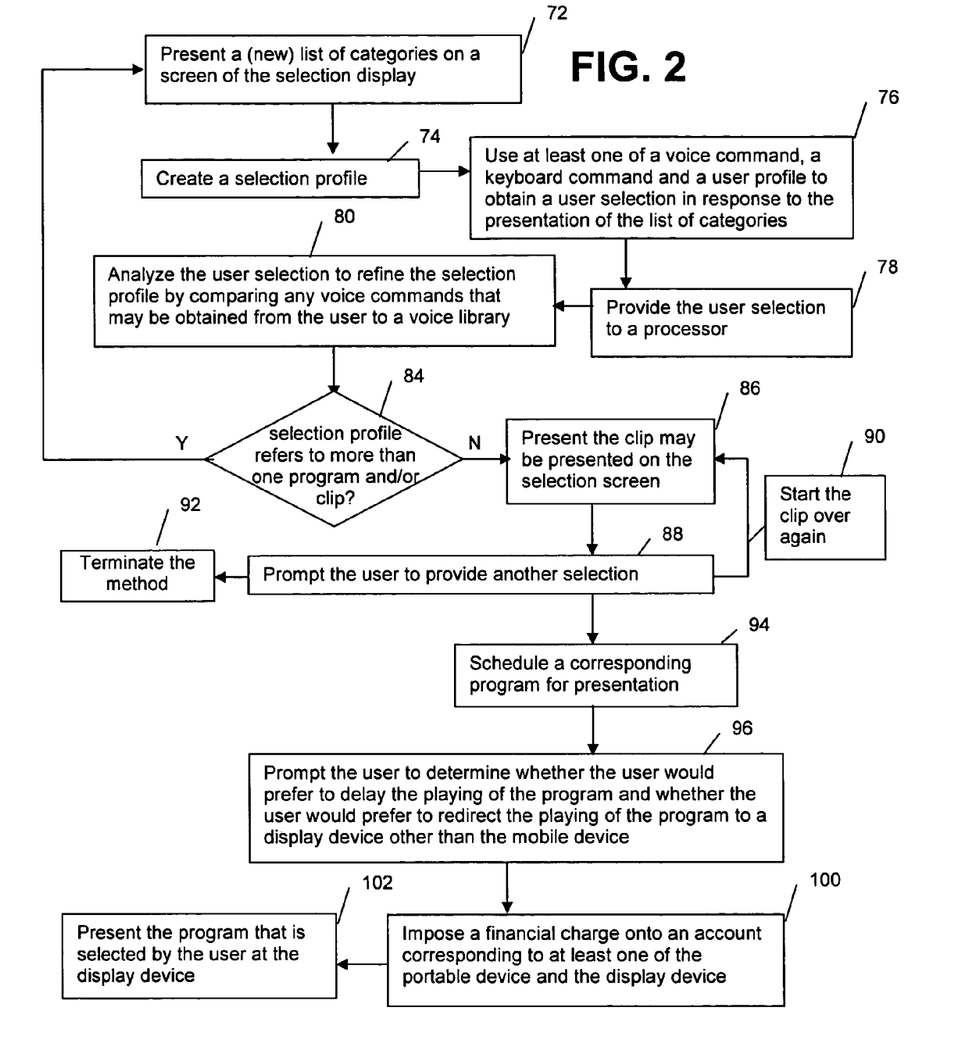
FIG. 2 is a flowchart depicting a method for selecting a program from a library of programs, in accordance with another embodiment of the present invention.

FIG. 2 is a flowchart depicting a method for selecting a program from a library of programs and clips, in accordance with one embodiment of the present invention. The method of FIG. 2 includes: iteratively querying a user until a clip is selected from the library of programs and clips; presenting the clip on a selection display; if the user of the portable device approves of the clip, and presenting a program corresponding to the clip on a presentation display, which may or may not be the same as the selection display. For purposes of explanation, in the embodiment of FIG. 2, the selection display resides within a portable device, and the selection display is distinct from the presentation display.

Iteratively querying the user may be accomplished through a voice-driven menu system in combination with a keypad entry and at least one user profile. For example, a list of categories may be presented 72 on a screen of the selection display, which may be a small screen on a portable device such as a cellular telephone, personal data assistant (PDA) such as a palm pilot, a cell phone, Blackberry, or other portable device. For purposes of illustration, the mobile device may be a smart phone, and accordingly through this description the term "smart phone" and the term "mobile device" will be used interchangeably. The list of categories may be comprehensive enough such that each and every clip of the library of clips falls within at least one category of the list of categories.

Presenting the list of categories 72 may be accomplished using text, using icons or other graphics, or a combination of text, icons, and/or graphics. The text, icons, and/or graphics may be animated. For example, an icon depicting a football or a soccer ball may represent sporting events, and an image of an actor may represent all movies in which the actor stars. Icons and other images may be used to represent categories of programming. A user may be able to download icons and images for each category.

A selection profile may be created 74. The selection profile may be, for example, a sequential query language (SQL) database query operative to retrieve a desired portion of the library of programs and clips, in accordance with user selections, and may reside within a storage device corresponding to the selection display For example, if the selection display is a small screen on a portable device, then the selection profile may reside within a local memory that is located within the portable device. The selection profile may alternately be stored in a remote memory corresponding to a server coupled to the portable device across a cellular telephone network or other wireless network, or may be distributed between a local memory and a remote memory. "Memory" refers to anything that can store information, including but not limited to read only memory (RAM), magnetic media such as a hard drive, optical media such as a CD-ROM, Flash memory, EPROM, EEPROM, magnetic hysteresis memory, and/or any combination thereof.

A user selection may be obtained 76 in response to the presentation of the list of categories. The user selection may be asserted using voice commands, keypad commands, and/or one or more user profiles. Thus, a user interface may allow the user to use a combination of voice and keypad entry. For example, the user may obtain a list of movies simply by speaking a command identifying a category of movies, and then in response to list, may use the keypad to scroll through category of programming or to select a number identifying programming within the list. For example, the user may simply speak a selection into the portable device, and/or may select one or more keys on a keypad of the portable device.

The user may speak a search phrase to one or more microphones (M) built into the smart phone. Multiple microphones may facilitate receiving the sound from the user's mouth as well as the user's nose, and a combined acoustic input may enable a compatible ASR engine to achieve a better speech recognition performance.

Thus, the system includes a smart phone-based multimodal voice browser (MVB) and its supporting infrastructure on the network-side where IPTV-based broadband content library. This new smart phone-based MVB technology makes it possible for a subscriber of an IPTV service offered by a wireline-based broadband network service provider to voice browse the IPTV content library over a high-speed wireless network such as one capable of offering third-generation (3G) multimedia services. This new voice-enabled MVB concept is built on the reality that the capability and functionality of today's smart phone is far greater than that available on STB with built-in ASR. Furthermore, the pace for adding ever increasing computation power and memory capacity to smart phone in any foreseeable future will be much faster than with STB. In addition, smart phone-based MVB technology extends the highly familiar notion of a personal "phonebook" built into everyday mobile phone to a "videobook" for all the video titles such an IPTV subscriber has ever pre-viewed in the past.

An application software known as "DSR Front-end" residing on the smart phone may record the speech in a high fidelity mode (such as at 256 Kbits in mono recording) and may compress the digitized audio in real time without losing any vital information needed by the ASR system—a part of the MVB Search Engine installed on the network side (a "network" ASR).

The IPTV multimedia content library supports multiple encoding formats for a same content item such as one for large-screen standard edition TV (SDTV), another one for large-screen high definition TV (HDTV), and a third one for small screen display. This allows an IPTV subscriber to voice browse a large IPTV content library and choose a few to preview on his or her authorized smart phone device before paying for a large-screen version to be viewed later on an IPTV screen in the subscriber's home.

The Multimodal Voice Browser (MVB) described in this invention supports a rating guard for viewing permission granted to a smart phone registered with the IPTV service provider. For example, if a smart phone is registered as a "PG13" device, the MVB will automatically block the preview of an R-rated mobile movie on the device, even if it is the only result found matching the user's voice search request. In addition, the MVB will not update the videobook on the device with the search result if it is associated with a movie content rated beyond the permission category granted.

The described embodiment thus allows an IPTV service subscriber to voice browse a video content on a registered smart phone while they or others are watching a separate program on their IPTV.

The MVB can automatically update the videobook with the search results displayed on the smart phone an IPTV user is using. The update will occur only if the user either explicitly selects one of the search results for "View Later" on a wireline IPTV or request a preview version for an immediate download to the smart phone.

After each MVB session, the MVB will automatically generate or update the existing speech recognition grammar or statistical language models stored on the smart phone based on the words or phrases recognized by the local ASR system with a high confidence . If a new word or phrase (such as a new music video title containing a person's name) is recognized by the network ASR that does not have a corresponding acoustic model for purpose of speech recognition by the local ASR engine, the MVB will invoke an on-board dictionary software to create a new lexicon entry with the common phonetic library on the smart phone.

The MVB supports an optional flash memory card when it is installed on an authorized smart phone device. If the browser detects the sufficient storage space available for a video content to be downloaded for preview, it will pass the "viewing options" provided by the IPTV service provider to the smart phone. One of such viewing options is that the user of the smart phone can choose to watch a preview version of the video content over a specified time period. For example, if such a user chooses to pay $.99 for watching a preview version of the video content found, the MVB will start a video stream for the preview and at the same time save each video segment buffered for previewing in real time on a local flash memory card. Each video content item stored in this way carries an expiration code and the MVB will only replay this item from the flash memory card if it has not expired.

The MVB will automatically adjust the weights for the words or phrases embedded in the videobook based on the past search history (just like a browser cookie for standard web browser). For example, if a user frequently searches for a sports channel or pay-per-view sporting event, the words or phrases embedded in the search results found will be assigned to a higher weight. As a result, the words or phrases the user selects to voice browse a desired video content in sporting category are more likely to be recognized during a subsequent search.

Any voice commands that may be obtained from the user may be compared 80 to a voice library to determine a user selection. A processor may be used to compare the selection spoken by the user with the voice library. Based on the comparison, some clips are eliminated from the selection profile, and a subsequent list of categories may be generated to further specify the user's selection.

The multimodal voice browser allows the user to respond to a multimedia search screen (for example, displaying a search screen and at the same time playing an audio prompt) with speech only input, push-button entry, or both. If both input channels receive the data from the user, the MVB will use both input streams to resolve any potential ambiguity embedded in the input. For example, when the user highlights a search screen as depicted in the example of a multimedia page display in paragraph 36 below, and if the user speaks a short phrase "CNN" and hits the key labeled for "2 (ABC)" on the smart phone, the local and network ASR system will automatically filter-out the recognition candidates if the first key word recognized in the return search string does not begin with a letter "A" or "B" or "C".

Since a smart phone is Internet ready, the user may download a latest release of such a MVB over-the-air (or using a high-speed data link such as USB). Once this MVB is loaded, the user can simply point the MVB to a "voice site" address (such as "http://U-Verse.sbc.com") operated by an IPTV service provider and then hit "Go" to start.

A network element affiliated with the IPTV service provider may automatically authenticate an originating MIN of the smart phone and then contact the IPTV service provider for a matching subscriber TN. Once a match is found (the subscriber can register multiple MINs with the same TN), a MIN-based search profile may be loaded into an MVB Search Engine. The MVB Search Engine may then retrieve a multimedia, such as a starting page or a home page, of a IPTV voice-search site over the wireless network and display it on the screen of the smart phone. The multimedia page received by the MVB Search Engine is of multimedia type such as one written in eXtensible Hybrid Text Markup Language (XHTML) with special voice tags (such as expressed in VoiceXML). The multimedia page can trigger a display of text/graphics/video on the smart phone and optionally at the same time trigger an audio event such as playing an audible system prompt on the built-in speakerphone.

Multiple smart phones may be registered based search profiles (N) associated with a single IPTV subscriber account for purpose of voice browsing of a very large IPTV multimedia content library. The N-to-1 association is accomplished through a device registration using a web interface over a wired or wireless network.

The MvB and related system components may be implemented on the network side with corresponding network access over two heterogeneous broadband networks (for example, one fiber-based IPTV network and other being a 3G-based wireless network).

An example multimedia page displayed by the MVB is depicted below:

|   | SBC U-Verse | Data Entry | Example Entries |
|---|---|---|---|
| 1 | IPTV Channel Number: | ___ | 9200 |
| 2 | IPTV Channel Name: | ___ | CNN |
| 3 | Movie Top10 | | |
| 4 | Movie Titles | _______ | Harry Potter |
| 5 | Voice Search (Press to speak) | | |

The MVB downloaded to a smart phone has a built-in ASR system. This is a "local" ASR system that depends upon the videobook maintained by the smart phone itself. Like a phonebook in typical mobile phone, the videobook in a smart phone initially does not have any entry. Therefore, the task of recognizing the user's voice search request is initially performed by the MVB search engine on the network side. This network-based speech recognition process operates as described below.

As soon as the user presses the talk button on the smart phone, the MVB sets up a connection of stream audio to a port to which the network ASR is listening. As the user starts to speak, the MVB feeds the compressed and packetized audio stream (C) generated from the DSR Front-end 50 to the network ASR over the air.

The network ASR recognizes the speech embedded in the packetized audio stream using a proper recognition vocabulary dynamically loaded based on the user's IPTV search profile. Based on the recognition result, the MVB search engine generates a new multimedia page that may contain intermediate search results or the final video title(s) the user is looking for.

For each return page, the MVB extracts the relevant key words or phrases specially coded in this multimedia page and saves these words/phrases in a videophone. These words/phrases may include, for example, movie titles, actor/actress' names, name of music video or of a TV program. The MVB also saves those most frequently used search phrases by the user such as "action movies" or "sports channel", "NBA finals", "outdoor fishing", etc.

When the videobook contains an adequate number of entries, the local ASR engine will become active. When active, it will attempt to recognize the incoming speech recorded in high fidelity while its compressed version is being sent over by the MVB for a similar recognition by the network ASR system. Unlike the network ASR, this local ASR engine uses a much smaller recognition vocabulary stored in the videobook and a more simple recognition grammar or a statistical language model (SLM) derived from the past search history. If one or more matches are found from this local search, this local ASR engine will submit the recognition result of historical significance (H) to the MVB. The MVB will immediately pass the search result to the MVB Search Engine. Combined words/phases contained in the recognition result generated from the local ASR engine with what is being recognized by the network ASR, the MVB Search Engine will be able to determine what video program the user is looking for with a much high search accuracy and in a much shorter search time.

If the user has found one or more video titles desired, the user can request a quick preview by downloading a shortened video clip associated with its full-length version. Or, the user can download a full-length version but in a small-screen edition for viewing on their smart phone. Alternatively, if the user would like to watch a standard definition (SD) for a large TV screen (SDTV) or a high definition version (HDTV), the user simply responds to the final selection page from the MVB browser, indicating "Watch Later" when the user arrives home (or changes his or her IPTV to a search screen using a standard IPTV STB).

If an IPTV subscriber has an active smart phone profile, whenever the subscriber switches the IPTV to a search screen using a standard IPTV remote control, the STB will present a user identification screen that requires the user to enter his or her 10-digit MIN and optionally a 4-digit password. The STB will then use the MIN to retrieve the last search result marked as "Watch Later" and stored on an IPTV network server. The result will be displayed on the IPTV screen just the same as it would be shown if the user had used a screen-based keyboard for typing a search phrase on their IPTV remote control.

A user may speak the name of the actor, movie type, or other category of programming, or may command that a list of actors, movie types, or other category of programming be presented. The portable device may transmit the user's voice to a central location for processing and comparison to a voice database for conversion to a user selection. Based on the user selection, the programming selected by the user may be re-transmitted to the portable device.

Similarly, any keypad commands that may be obtained from the user can be analyzed. Keypad commands may be obtained by repetitive keystrokes to enter alphanumeric commands, or may be single-keystroke or multiple keystroke commands.

The method may also access a user profile of the user. If the user has selected particular categories in previous accesses of the program library, then the method may give priority to the previously-selected categories in subsequent access to the program library. The method may thus adaptively determine the at least one visual list of categories based upon at least one of a previously received voice command and a user profile corresponding to the user. The method may adaptively determine a category of programming that a user prefers, such as movies of a particular type or movies starring a particular actor, and may automatically give priority to programs matching the category of programming that the user prefers.

The method may also access user profiles of other users. For example, if a first user prefers program A and program B, and a second user has viewed program A several times, then the method may suggest program B to the second user. The accessing of other user's profiles need not be specific to programs: if the first user has requested comedies and dramas, and the second user has requested comedies, the method may include suggesting dramas to user B. The method may adaptively determine a category of programming that the first user prefers, such as movies of a particular type or movies starring a particular actor, and when performing a search for the second user may automatically give priority to programs matching the category of programming that the first user prefers.

The user selection may be provided to a processor. The processor may reside within the portable device, or may reside within a server or elsewhere within a network that includes the portable device. The processor may be distributed, such that a portion of the processor resides within the portable device and a portion of the processor may reside within a server or elsewhere within the network. The processor may be a microprocessor, a collection of microprocessors, or other logic circuitry such as dedicated single-purpose application specific integrated circuits (ASICs); programmable logic such as field programmable logic, programmable logic arrays (PLAs), and macrocells; or logic gates, such as a collection of AND gates. The processor may be implemented in hardware, software, or a combination of hardware and software, and may be fully or partially integrated with video delivery and/or signal processing technology.

The user selection may be then analyzed 80 to refine the selection profile. A determination may be made whether the selection profile 84 refers to more than one program and/or clip within the library of programs and clips, and if so, then a new list of categories may be generated and presented 86 to the user. The new list of categories may allow the user to broaden, narrow, or restart the selection profile. The user may then be prompted 88 to provide another user selection, and a user selection may be obtained 76.

The processor within the portable device, or within a server or other intelligent device within or coupled to the portable device, generates a refined list of categories such that a subsequent user selection can further update the selection profile to reduce still further the number of clips of the library of clips that conform to the selection profile. Eventually, after only a few selections, a particular clip is selected.

It should be noted that the user may be able to define new categories by constructing Boolean cancatenations of queries. For example, the user may be able to define a category including all movies in which a particular user-defined combination of actors star. A user may desire to define a first category containing all movies that are based on printed literary works, a second category of sporting events in which a favorite sports team plays, and a third category including video clips of space shuttle launches.

As the user iteratively speaks selections into the portable device, the selection profile is narrowed. The iterative process continues to repeat, and the selection profile continues to narrow, until the selection profile indicates only one clip.

If desired, and in accordance with another embodiment of the present invention, the particular clip is selected by a fellow user. The fellow user emails the particular clip such that the particular clip may be viewable on the portable device. The particular clip may also reside on a web site or on a mass storage device.

If the selection profile refers to one program and/or clip within the library of programs and clips, then the system may present the clip selected on the selection screen, which may be within the portable device. The clip may be, for example, a trailer of a movie, a sporting event, a news event, and/or a dramatic performance. The user may use voice commands to control how the clip is displayed. For example, the user may use voice commands to cause the clip to be rewound, fast-forwarded, stopped, paused, restarted, and/or stored within the local memory or within the remote memory.

Thus, the iterative process includes presenting a general list that may allow a user to select a program based on content type: movie, news, sporting event, etc. Once the user has selected a category, then the method may provide another list of categories: for example, if the user has selected "movie" in the general list of categories, the user may be allowed to select "By actor," "By director," "By type," etc. If the user selects "By type," then the user may be allows to select "Comedy," "Drama," etc.

The user may also be able to select by more than one category at once. For example, a user may be allowed to select an actor, and then return to a previous menu to select a type. Boolean combinations of searches may be created and stored with respect to each user. If a user selects a particular actor and then selects "Comedy," for example, the user may be presented with a list of comedies staring the particular actor. Once the clip (or a portion thereof) has been presented 86, the user may be prompted 88 to determine whether the user wishes to start the clip over again 90, terminate the method 92, or schedule a corresponding program for presentation 94.

If the user schedules a corresponding program for presentation 94, the user may be prompted 96 to determine whether the user would prefer to delay the playing of the program, and to determine whether the user would prefer to redirect the playing of the program to a display device other than the mobile device. The user may command that the playing of the program be delayed until a time that the user determines, such as "7:00 p.m. this evening," or indefinitely, such as "until I request that the program be played." The user may also command that the playing of the program be redirected to a display device other than the mobile device. For example, a central server may store a list of set top boxes, computer systems, television sets, IPTV sets, or other display devices that correspond to the user. The user may be presented with a list of display devices, and may redirect the playing of the program to a display device on the list of display devices.

If the user indicates a command to redirect the playing of the program to a display device other than the mobile device, the method includes determining which display device. An IPTV subscriber is identified with a telephone number (TN) which is typically a 10-digit TN associated with a telephone line terminated at a customer premise where an IPTV network terminates and connects to a set top box. Prior to use of a smart phone for this new IPTV service, the subscriber (TN) needs to register the smart phone identified by a 10-digit mobile identification number (MIN). The registration may be done either through a web site, by calling an interactive voice response (IVR) system, or through other means.

If desired, a central server may store a list of set top boxes, computer systems, television sets, IPTV sets, or other display devices that correspond to a friend of the user. The user may thus be able to provide the program, as a gift, to a friend. The user may be presented with a list of friends, which the user may have uploaded beforehand, and may select a friend from the list of friends. Either the user or the friend of the user may then be presented with a list of display devices corresponding to the friend, and may redirect the playing of the program to a display device on the list of display devices.

The method depicted in the flowchart of FIG. 2 may also include imposing a financial charge onto an account corresponding to at least one of the portable device and the display device 100. If a common service provider provides the mobile device and the display device, then the financial charge may be imposed on an account corresponding to the mobile device. For example, the financial charge may appear on the user's next cellular telephone bill. If desired, the financial charge may appear on the user's next cable/satellite bill, or Internet service provider bill, or other bill sent by the common service provider. If the user prefers to receive distinct bills for each service, such a cellular telephone bill that is distinct from a telephone bill, then the user may be allowed to determine beforehand how the financial charge shall be apportioned. For example, the user may be allowed to apportion 50% of the financial charge to the cellular phone bill, and 50% percent of the financial charge to the cable/satellite bill.

Finally, the program that is selected by the user is presented at the display device 102. The user may stop the presentation at the display device, and may add the presentation to a list of favorites. The user may also create video clips of favorite scenes, which may subsequently be viewed on the portable device.

Figure 3:
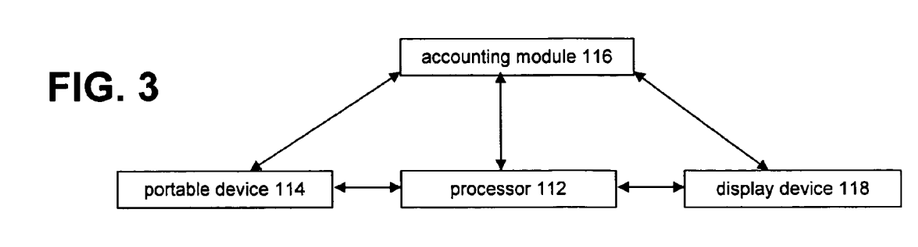
FIG. 3 is a schematic diagram depicting a system for selecting a program from a library of programs, in accordance with still another embodiment of the present invention.

FIG. 3 is a schematic diagram depicting a system for selecting a program from a library of programs, in accordance with another embodiment of the present invention. The system may comprise a processor 112 that is operative to determine a user selection based upon a voice command. The system may also comprise a display device 118 that is operative to present the program, in accordance with the voice command.

The processor 112 may be operative to identify the program. The processor 112 may also be operative to adaptively determine at least one visual list of categories based upon at least one of a previously received voice command and a user profile corresponding to the user. The processor 112 may iteratively (a) provide at least one visual list of categories, and (b) receive a voice command in response to the visual list of categories. The processor 112 may be operative to provide at least one visual list of categories by generating a database query operative to retrieve the at least one visual list of categories from the library of programs.

The system may also comprise a portable device 114 operative to receive the voice command. The portable device 114 may be operative to present at least one portion of at least one program of the library of programs.

The system may also comprise an accounting module 116. The accounting module 116 may be operative to impose a financial charge onto an account corresponding to at least one of the portable device 114 and the display device 118.

Figure 4:
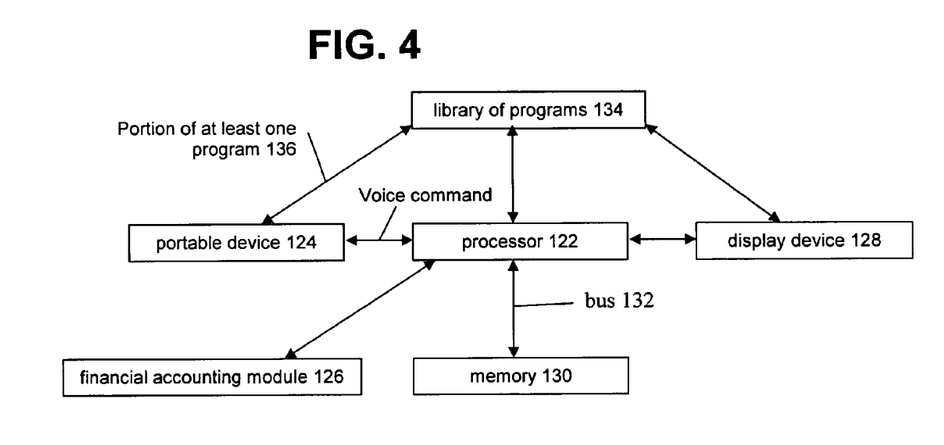
FIG. 4 is a schematic representation of a computer system in accordance with yet another embodiment of the present invention.

FIG. 4 is a schematic representation of a computer system in accordance with yet another embodiment of the present invention. The computer system may include a processor 122, a bus 132 coupled to the processor 122, and a memory 130. The memory 130 may be regarded as a computer-readable medium containing a set of instructions that when executed by the processor 122 may cause the processor 122 to perform a method in accordance with the set of instructions. Specifically, the set of instructions may cause the processor 122 to determine a user selection based upon a voice command, and to command a display device 128 to present the program, in accordance with the voice command.

The set of instructions may also cause the processor 122 to receive the voice command from a portable device 124, to command the portable device 124 to present at least one portion 136 of at least one program of the library of programs 134, and to identify the program in accordance with the voice command. To cause the processor 122 to identify the program, the set of instructions may cause the processor 122 to iteratively (a) provide at least one visual list of categories, and (b) receive a voice command in response to the visual list of categories.

The set of instructions may further cause the processor 122 to adaptively determine at least one visual list of categories based upon either a previously received voice command, a user profile corresponding to the user, or both a previously received voice command and a user profile corresponding to the user.

To cause the processor 122 to provide at least one visual list of categories, the set of instructions may cause the processor 122 to generate a database query. A database search within the library of programs 134 may be performed in response to the database query, and the database search may retrieve the visual list of categories (or the visual lists of categories) from the library of programs 134.

The processor 122 may be implemented as a single microprocessor or as multiple processors. If the processor 122 is implemented as a single microprocessor, then the single microprocessor may be located either within a set top box or elsewhere within a network. If the processor 122 is implemented as multiple microprocessors, then the processor 122 may include a microprocessor located within a set top box coupled to the display device 128. A first microprocessor may be implemented to communicate with the portable device 124 and to receive a selection of a program, and a second microprocessor may be implemented to communicate with the display device 128.

The set of instructions may also be operative to cause the processor 122 to access a financial accounting module 126 impose a financial charge onto an account corresponding to the user. Specifically, the financial charge may be placed onto an account that corresponds to the portable device 124, or onto an account that corresponds to the display device 128. If desired, the financial charge may be apportioned between the accounts corresponding to the portable device 124 and to the display device 128. If desired, a single account may be assigned to the user, and all charges associated with the portable device 124 and with the display device 128 may be imposed onto the single account; accordingly, the set of instructions may be operative to cause the processor 122 to impose the financial charge onto the single account.

The method thus described may be implemented with a much broadly available smart phone technology which is a natural and commonly-used device for speech-based interaction. Many of smart phone devices have five of the six basic building blocks for implementing the core functionality of a MVB thus described.

One such basic building block is receiving speech from one or more built-in microphones (supported by all smart phone devices today). Another is outputting speech/sound using a built-in speakerphone, or an audio connector for a mono/stereo earpieces, or through Bluetooth wireless connection to a listening device (supported by all smart phone devices today). Still another basic building block is a powerful CPU (getting even more powerful each year) for running a mobile-version web browser as well as running a large-vocabulary ASR system on board in near real time (supported by most smart phone devices today).

Yet another basic building block is a relatively large memory storage to load necessary speech recognition grammars used by the local ASR engine (supported by most smart phone devices today). Stull another basic building block is a relatively large data storage for storing the acoustic models for all possible words or phrases to be recognized by the local ASR system (supported by most smart phone devices today). Finally, the basic building blocks include an increasingly large data storage such as flash memory cards (which can hold as many 2GB data) which makes it possible to store a sophisticated SLM created from every captured search utterance over a longest expected life cycle for a smart phone. This is the only feature that most smart phone devices do not currently have but such a feature is expected to be widely available in 18 months.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A method, comprising:
   receiving, from a mobile telephony device via a wireless telephone network, a user selection signal indicative of a multimedia content program;
   accessing a multimedia content library including a small screen version of the multimedia content program indicated by the user selection signal and a large screen version of the multimedia content program; and
   delivering, by a provider network server, the large screen version of the multimedia content program to a set top box in an IP television network and the small screen version of the multimedia content program to the mobile telephony device.

2. The method of claim 1, wherein the wireless telephone network is a cellular telephone network.

3. The method of claim 2, further comprising:
   presenting at least one portion of the multimedia program on the mobile telephony device.

4. The method of claim 1, further comprising:
   providing a visual list of categories of multimedia programs; and receiving the user selection signal in response to the visual list of categories.

5. The method of claim 4, wherein providing the visual list of categories includes:
adaptively determining the visual list of categories based upon at least one of:
a previously received user selection signal; and
a user profile corresponding to the user.

6. The method of claim 2, wherein the IP television network comprises a broadband wireline network.

7. The method of claim 1, further comprising:
charging an account associated with a device selected from: the mobile telephony device and the set top box.

8. The method of claim 1, wherein the mobile telephony device comprises a smart phone.

9. The method of claim 1, further comprising:
responsive to receiving, from the mobile telephony device, a user search for a desired multimedia program, marking the desired multimedia program as one for later viewing.

10. The method of claim 9, further comprising:
providing later viewing data indicative of the desired multimedia program to the set top box, wherein the set top box responds to a remote control signal associated with a set top box search, by accessing the later viewing data to list the desired multimedia program in a selection screen.

11. A multimedia content system, comprising:
a processor;
a computer readable storage device, including processor executable instructions that, when executed by the processor, cause the processor to perform operations comprising:
receiving, from a mobile telephony device via a wireless telephone network, a user selection signal indicative of a multimedia content program;
accessing a multimedia content library including a small screen version of the multimedia content program indicated by the user selection signal and a large screen version of the multimedia content program; and
delivering, by a provider network server, the large screen version of the multimedia content program to a set top box in an IP television network and the small screen version of the multimedia content program to the mobile telephony device.

12. The system of claim 11, wherein the wireless telephone network is a 3G cellular network.

13. The system of claim 11, wherein the operations include:
providing a visual list of multimedia content categories; and
receiving the user selection signal in response to the visual list of categories.

14. The system of claim 13, wherein the operations include:
determining a visual list of multimedia content categories based upon an indicator selected from: a previously received user selection signal and a user profile corresponding to the user.

15. The system of claim 13, wherein the operations include:
providing the visual list of multimedia content categories by generating a database query operative to retrieve the visual list of multimedia content categories from the multimedia content library.

16. The system of claim 12, wherein the operations include:
charging an account corresponding to the user.

17. A computer-readable storage device including processor executable instructions that, when executed by the processor, cause the processor to perform operations comprising:
receiving, from a mobile telephony device via a wireless telephone network, a user selection signal indicative of a multimedia content program;
accessing a multimedia content library including a small screen version of the multimedia content program indicated by the user selection signal and a large screen version of the multimedia content program; and
delivering, by a provider network server, the large screen version of the multimedia content program to a set top box in an IP television network and the small screen version of the multimedia content program to the mobile telephony device.

18. The computer-readable storage device of claim 17, wherein the user selection signal comprises a 3G cellular signal.

19. The computer-readable storage device of claim 17, wherein the operations:
identifying the multimedia content program, including:
providing a visual list of multimedia content categories; and
receiving the user selection signal based on the visual list of multimedia content categories.

20. The computer-readable storage device of claim 19, wherein the operations include:
determining the visual list of multimedia content categories based upon a previously received user selection signal and a user profile corresponding to the user.

21. The computer-readable storage device of claim 19, wherein the operations include:
providing the visual list of multimedia content categories by generating a database query operative to retrieve the visual list of multimedia content categories from the multimedia content library.

22. The computer-readable storage device of claim 17, wherein the operations include:
charging an account corresponding to a device selected from: the wireless telephony device and the display device.

23. The computer-readable storage device of claim 17, wherein the target display device is selectable as the wireless telephony device accessible via the wireless telephone network.

* * * * *